Wolf & Haag.
Water Wheel.
N°94,162. Patented Aug. 24, 1869.
Fig: 1.
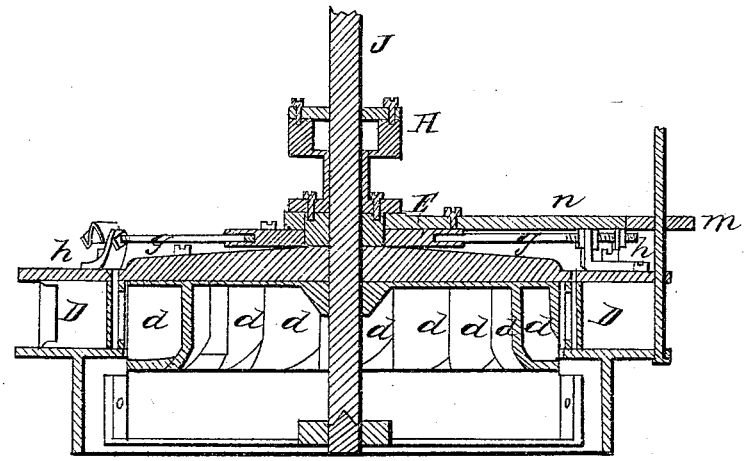
Fig: 2.
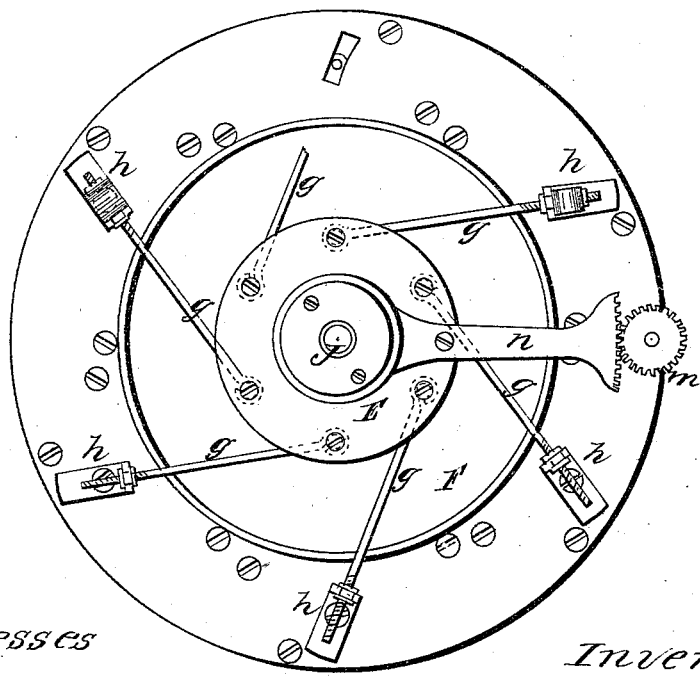
Witnesses
P. Alexander
H. N. Miller
Inventors
A. N. Wolf & J. Haag
per J. N. Alexander their Atty Wolf & Haag.
Water Wheel.
N° 94,162. Patented Aug. 24, 1869.
Fig: 3.
Fig: 4.
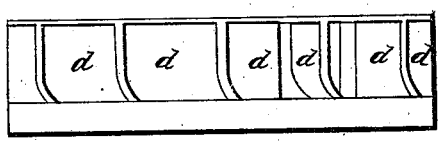
Fig: 5.
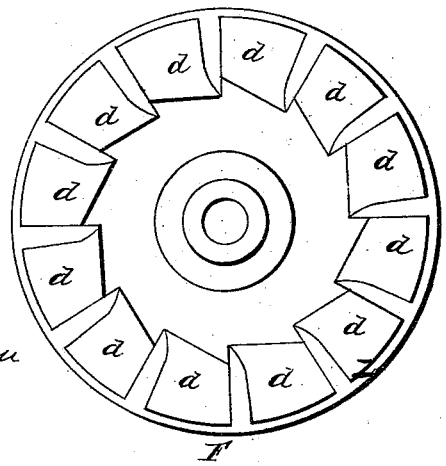
Witnesses
P. Alexanou
H. N. Miller
Inventors
A. N. Wolf & J. Haag
Per J. A. Alexanou Atty

United States Patent Office.

ABRAHAM N. WOLF, OF MILL CREEK TOWNSHIP, AND JOEL HAAG, OF BERNVILLE, PENNSYLVANIA.

Letters Patent No. 94,162, dated August 24, 1869.

IMPROVEMENT IN WATER-WHEELS.

The Schedule referred to in these Letters Patent and making part of the same.

*To all whom it may concern:*

Be it known that we, ABRAHAM N. WOLF, of Mill Creek township, in the county of Lebanon, and JOEL HAAG, of Bernville, in the county of Berks, and State of Pennsylvania, have invented certain new and useful Improvements in Turbine-Centre and Lower-Discharge Water-Wheels; and we do hereby declare that the following is a full, clear, and exact description thereof, reference being had to the accompanying drawings, and to the letters of reference marked thereon, which form a part of this specification, in which—

Figure 1 is a central vertical section of our wheel.

Figure 2 is a plan view of the same.

Figure 3 is a plan view, with upper rim of the wheel removed.

Figure 4 is a side view of water-wheel.

Figure 5 is a plan view of the water-wheel inverted.

The nature of our invention consists in constructing adjustable valves, for the purpose of regulating the quantity of water applied to the buckets of a horizontal water-wheel.

Our invention further consists in the peculiar means employed for operating the valves.

Also, in the combination and general arrangement of the parts hereinafter mentioned A, in the annexed drawings, represents a plan view of the upper casing of the wheel; also the position and form of the valves C;

D represents the guards; and

B the gates.

The guards D are formed so as to curve inward at their outer end, and confined in position by screw-bolts.

The gates B are pivoted at their lower end by means of a bolt, so as to admit of its opening and closing the chute, through which the water reaches the buckets d.

The mode of rendering the said gate adjustable will be hereinafter described.

C designates a concavo-convex valve, hinged to the outer end of gate B; its office being to prevent the water entering between the guard D and the gate B.

E represents a grooved wheel, secured to the surface of casing A.

g g are metal rods, the inner ends of which enter the groove in wheel E, and are there fastened with a bolt.

The outer ends of rods g g pass through a slide, marked h; the said slides being placed directly over a slot cut in the rim or casing A, and having a screw-bolt passing through them, through the slot, and into the gate B.

As the outer end of each rod g is formed into a screw, and is furnished with a nut on each side of slide h, by operating said nuts, it will be seen that the slide h and the gate B, to which the slide is fastened, will move outward or inward, as required, and either diminish or enlarge the opening in the chute.

It will be observed that the slides h h are operated simultaneously by means of the spur-wheel m, which gears into the cogged bar n; the said cogged bar n being rigidly confined to the surface of grooved wheel E.

H designates a box, embracing the shaft j of the water-wheel F; the said box being designed as an oil-chamber, from which oil will exude to lubricate the step, on which the shaft rests.

The water-wheel F revolves inside of casing A, and is furnished with buckets of a convexo-concave form.

Having thus described our invention,

What we claim, and desire to secure by Letters Patent, is—

1. The valves C C, in combination with gates B B, operating together, substantially as and for the purpose described.

2. The combination, substantially as set forth, of guards D D, valves C C, and gates B B.

3. The slides h h, in combination with valves C C, when said valves are pivoted to the gates B B, substantially as set forth.

4. In combination with valves C C, the slides h h, rods g g, and grooved wheel E, all arranged to operate substantially as described.

5. The wheel F, in combination with gates B B, guards D D, and valves C C, all combined as and for the purpose set forth.

In testimony that we claim the foregoing as our own, we affix our signatures, in presence of two witnesses.

A. N. WOLF.
JOEL HAAG.

Witnesses:
 CYRUS GEISER,
 ISRAEL GARRETT.